June 23, 1964   H. NERWIN   3,138,081
ROLL FILM MAGAZINE
Original Filed Jan. 2, 1962   4 Sheets-Sheet 1

Hubert Nerwin
INVENTOR.

BY R. Frank Smith
Malcolm J. Dunn
ATTORNEYS

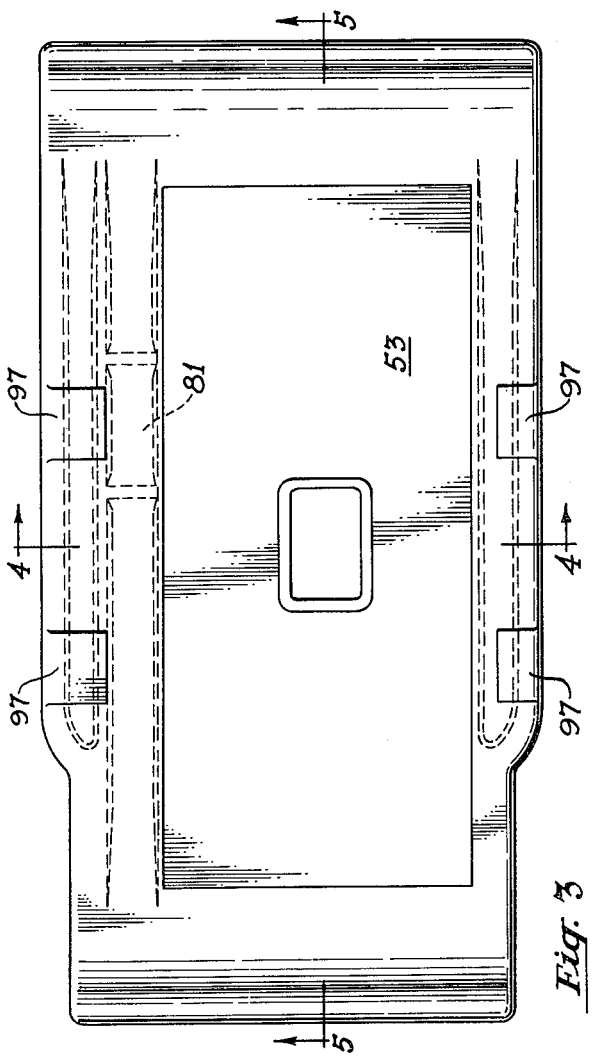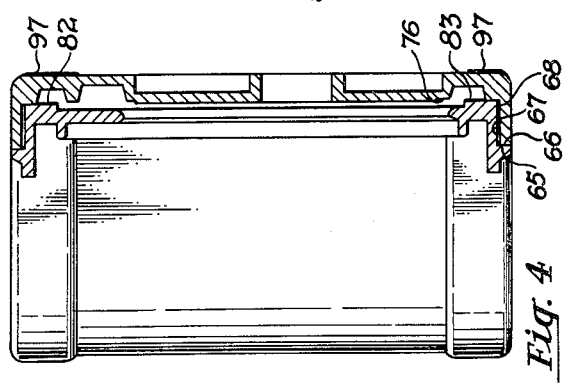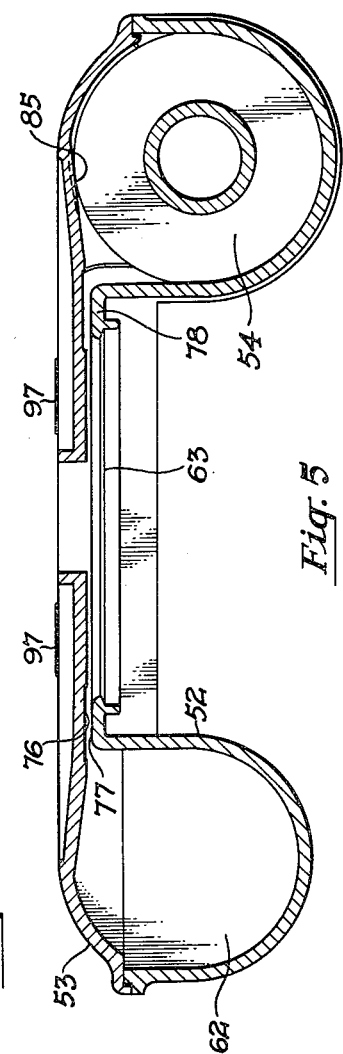

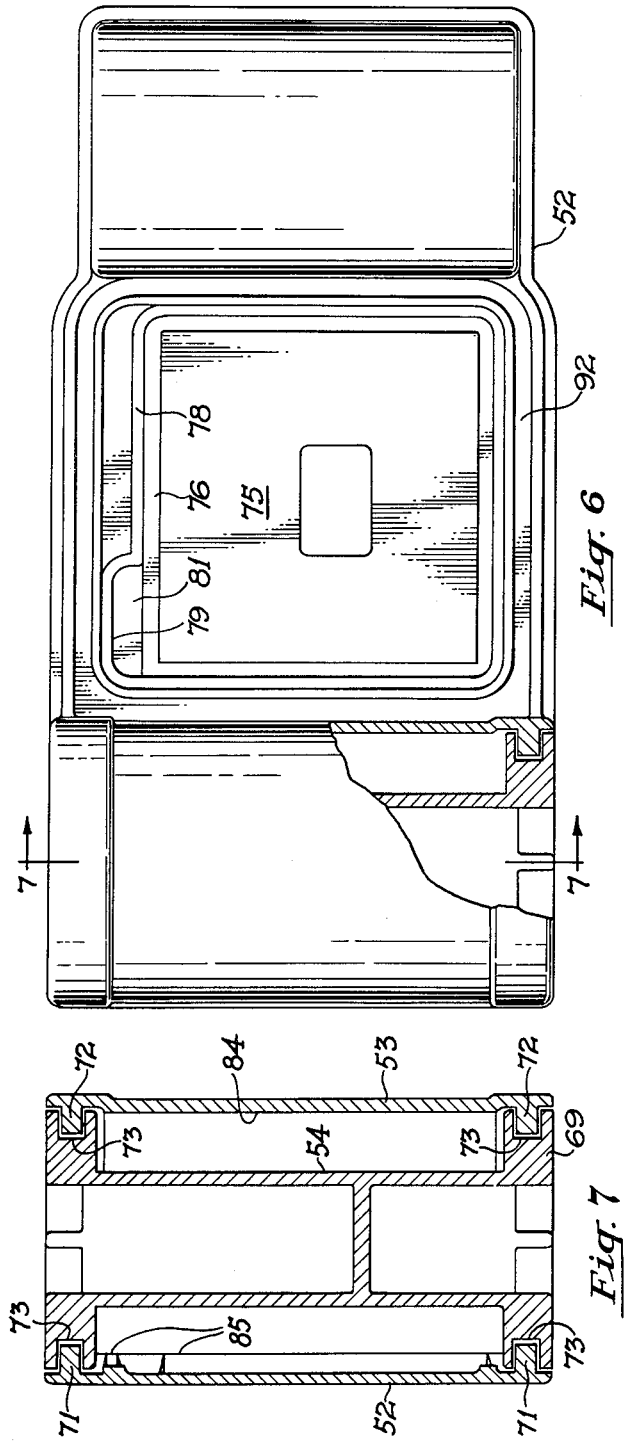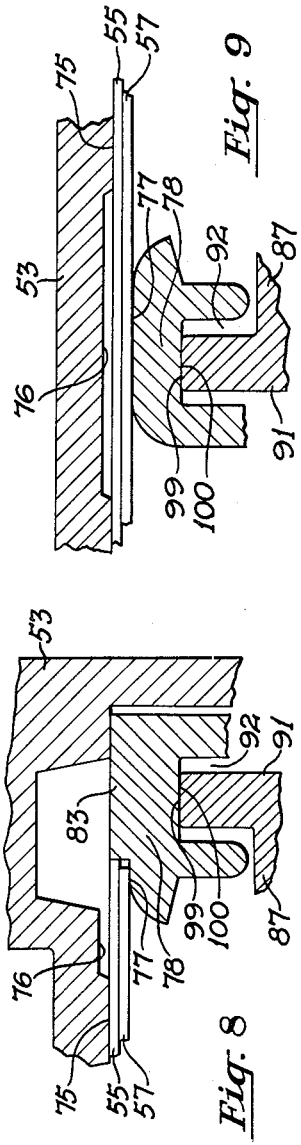

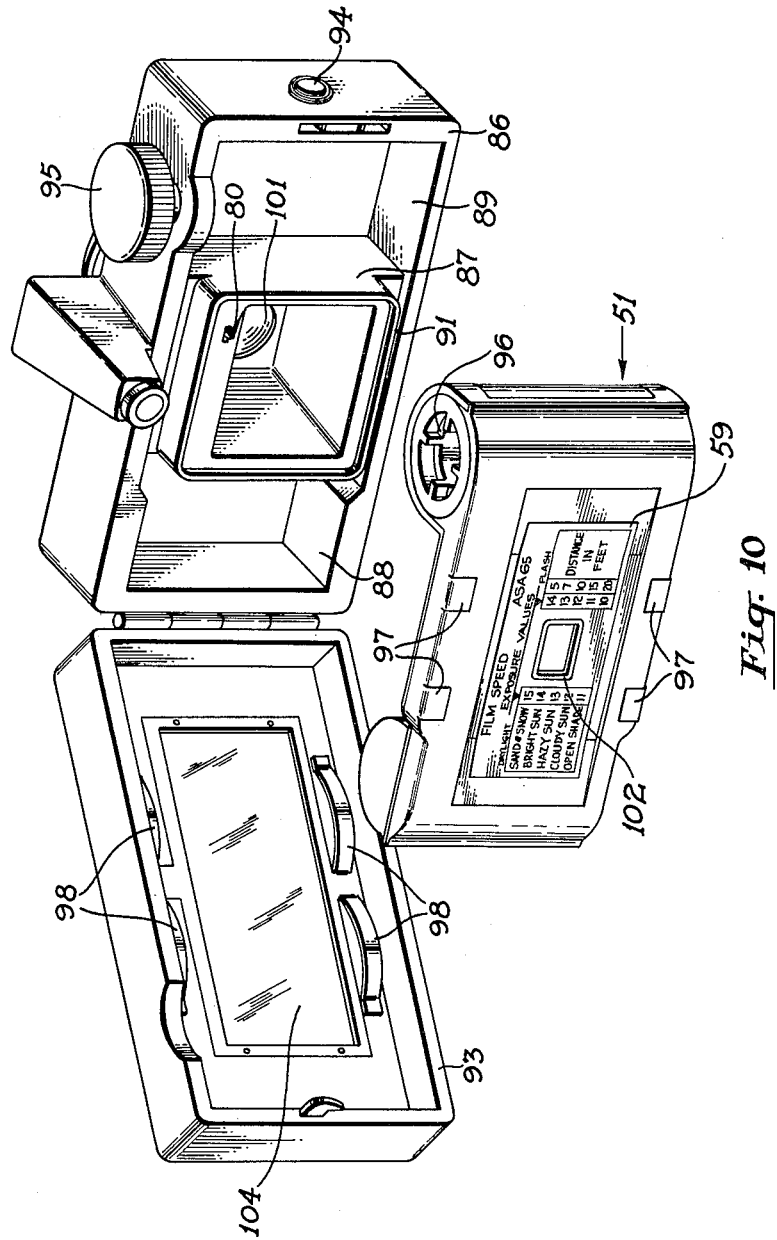

United States Patent Office 3,138,081
Patented June 23, 1964

3,138,081
ROLL FILM MAGAZINE
Hubert Nerwin, Rochester, N.Y., assignor to Eastman Kodak Company, Rochester, N.Y., a corporation of New Jersey
Original application Jan. 2, 1962, Ser. No. 163,843. Divided and this application Nov. 4, 1963, Ser. No. 321,223
4 Claims. (Cl. 95—31)

The present invention relates to photographic still cameras and roll film magazines for use therein, such cameras and magazines therefor being of the general type described in pending U.S. patent application, Serial No. 129,303, filed August 4, 1961, in the name of Douglass C. Harvey. More particularly, the invention relates to roll film magazines for use in such cameras and comprising molded, plastic components. This is a divisional application of my pending U.S. application, Serial No. 163,843, filed January 2, 1962.

While the magazine construction disclosed and described in the above-cited Harvey patent application overcomes many disadvantages of prior magazines, a principal object of the present invention is to further simplify the construction of such magazines to reduce the cost thereof to such an extent that the magazines may be loaded at the factory and discarded by the film processor without prohibitive expense to the customer.

Another object of the invention is to increase the rigidity of such magazines to minimize distortion of the film plane and to improve the means for accurately locating the film plane with respect to the camera lens system; whereby such a magazine may be used not only in simple cameras having a relatively small lens aperture and a relatively large acceptable circle of confusion, and consequently a relatively large permissible deviation in the location of the film plane relative to the lens system, but also in more refined cameras in which a larger lens aperture and/or a smaller acceptable circle of confusion dictates more accurate positioning of the film in the focal plane.

Still another object of the invention is to further improve the light sealing means of such magazines without employing separate light sealing elements.

Yet another object of the invention is to facilitate the assembly of such a magazine by so forming the magazine body members that loading the magazine comprises merely laying a roll of unexposed film and a film spool attached thereto in corresponding receptacles in one of the body members, closing the magazine by means of another body member, and joining the body members together.

In all but the very simplest cameras, means are provided for adjusting the shutter speed and/or the lens diaphragm opening to vary the exposure of the film. Regardless of the means used for determining or regulating the exposure, the speed or sensitivity of the particular film used in the camera must be taken into consideration. In lieu of using a light meter or a camera having a built-in photo-electric exposure control mechanism, the exposure adjustments are commonly made by reference to a simple table showing appropriate settings for film of a particular sensitivity under various conditions of illumination. Such tables are customarily supplied with the film. If, however, the camera user does not have the appropriate table when he takes a photograph, or, if he has forgotten the type of film in the camera, his film is apt to be improperly exposed. Another object of the invention is therefore to provide a disposable magazine with an appropriate exposure table permanently attached thereto for use with a camera adapted to accommodate such a magazine whereby the camera has means making it possible for the exposure table to be visible from the exterior of the camera.

Other objects of the invention are apparent from the following description, references being made to the accompanying drawings in which:

FIG. 3 is a rear elevational view of the film magazine;

FIG. 4 is a sectional view of an empty magazine taken along the lines 4—4 of FIG. 3;

FIG. 5 is a sectional view taken along the lines 5—5 of FIG. 3;

FIG. 6 is a partial sectional front elevational view of the empty film magazine;

FIG. 7 is a sectional view taken along the lines 7—7 of FIG. 6;

FIG. 8 is an enlarged portion of FIG. 4 showing the means employed to support and locate one edge of the film and backing paper in the exposure plane in the magazine;

FIG. 9 is an enlarged portion of FIG. 5 showing the light sealing means employed in the film passageway of the film supply chamber of the magazine; and FIG. 10 is a perspective view of a camera showing a magazine in position for insertion into the camera.

*The Film Magazine*

Figure 2:
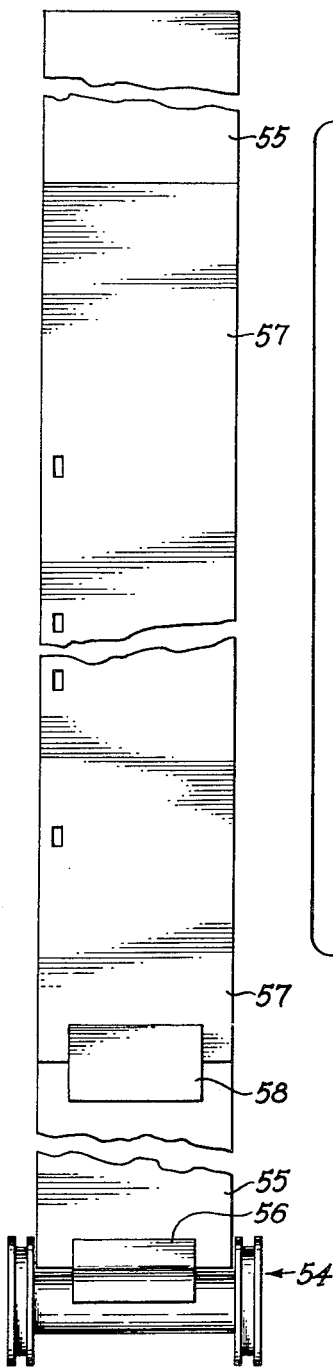
FIG. 2 is a broken plan view of the roll film and backing paper used in the magazine as seen from the film side.
Figure 1:
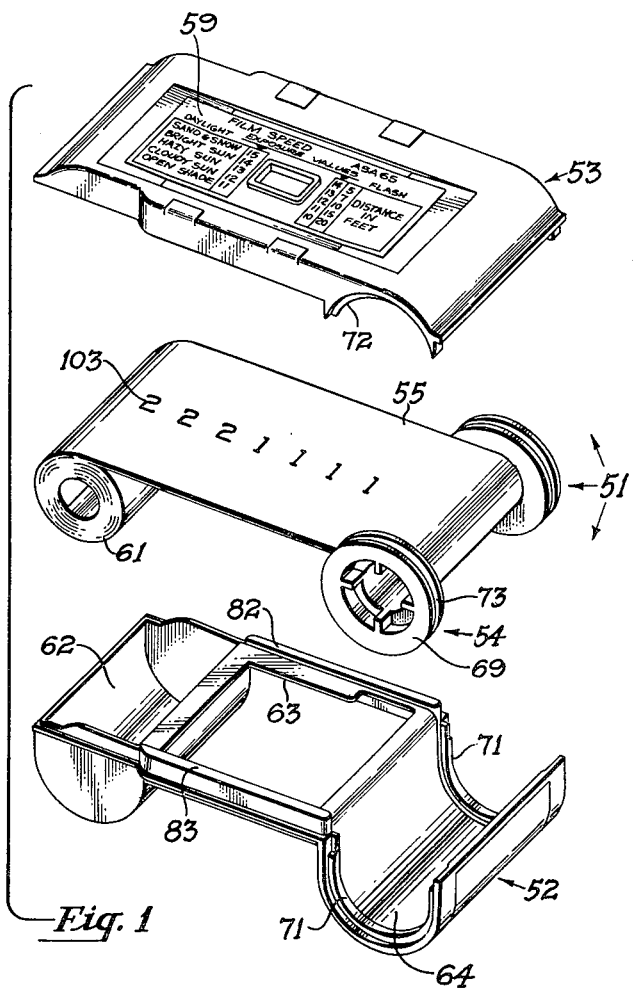
FIG. 1 is an exploded perspective view of a loaded film magazine according to a preferred embodiment of the invention.

*General description.*—As is readily apparent from FIGS. 1–10 and more particularly from FIGS. 1 and 2, a loaded film magazine 51 of a preferred form of the present invention comprises a molded plastic magazine body 52, a molded plastic magazine cover 53, a molded plastic spool 54, a strip of light protective paper 55 attached to take-up spool 54 by an adhesive paster 56, a length of film 57 attached to the protective paper 55 by a second adhesive paster 58 and a film identification and exposure guide 59 attached to the magazine cover 53. In the assembled magazine the film is initially wound upon itself to form a film supply roll 61 which is housed in the film supply chamber 62 formed by the cooperation of the magazine body and the magazine back as illustrated in cross section in FIG. 5, with the backing paper extending across the magazine exposure opening 63 and attached to spool 54 located in the film spool chamber 64. With the magazine componentes so disposed, the cover member 53 is cemented or otherwise permanently joined to the magazine body 52. Since the magazine is not intended to be reloaded, an exposed roll of film is removed therefrom for processing by breaking the magazine open.

*Light sealing means.*—In order to prevent light from entering the magazine along the mating edges of the body and the cover member, these edges are provided at all points with closely fitting mating surfaces normal to the adjacent outer surface of the magazine, as shown for example at 65 and 66 of FIG. 4 and with contiguous mating surfaces as shown for example at 67 and 68 at right angles thereto to effectively block the entry of light through the joint. As is most clearly illustrated in FIGS. 1 and 7, the light sealing means employed at the ends of the film take-up chamber to prevent light leakage past the spool flanges 69 comprise annular ribs 71 and 72 on the magazine body 52 and the cover 53 respectively, which engage circumferential grooves 73 in each of the spool flanges 69 to rotatably support and locate the film spool. The junctures of the ribs are protected against light leakage by overlapping mating surfaces as previously described.

*Magazine film gate and film passageways.*—According to the present invention, the portion of film to be exposed is accurately supported in a flat plane behind the magazine exposure opening by means integral with the molded magazine components, and the magazine itself is accurately located in the camera, as described later, to insure that the film in the exposure opening lies in the focal plane of the camera lens system. To support the film in a flat plane, the magazine cover is provided with a flat rectangular surface 75 surrounded by a shallow recess 76 as shown in plan view by FIG. 6 and in cross section in FIGS. 4, 5, 8 and 9. The film and backing paper are maintained in flat supported engagement with surface 75 by the engagement of the film with a rectangular rearwardly facing surface 77 of the magazine wall 78 surrounding the exposure opening opposite recess 76 and spaced forwardly of surface 75 by a distance closely approximating the combined thickness of the film and paper. Thus, as shown in enlarged views in FIGS. 8 and 9, the film and paper are maintained in flat relation against surface 75 due to their natural resistance to being simultaneously flexed in transverse directions. In case the combined thickness of the film and paper is slightly greater than the distance between the planes of surfaces 75 and 77, the film and paper are bowed slightly into recess 76 without materially effecting the flatness of the film in the exposure plane or causing the film to bind as it is wound across the opening. Along the top edge of the exposure opening, the magazine wall 78 is provided with a notch 79 to accommodate the end of a metering member, as shown at 80, in FIG. 10, which is adapted to extend through the film and into a recess 81 in the magazine cover as described in the above-mentioned pending Harvey application. Since the film extends beyond the top of the notch, however, the continuous surface 77 is narrowed but not completely interrupted thereby.

FIG. 9 is an enlarged cross sectional view of the film passageway into the film supply chamber, the same construction, also being employed in the passageway of the spool chamber as shown in FIG. 5. As previously explained, the film is maintained in contact with surface 77 of wall 78 by virtue of the resiliency of the film and paper and the correspondence between the combined thickness of the film and paper and the spacing of surfaces 75 and 77. The intimate contact thus obtained between the film and surface 77 eliminates the need for additional light sealing elements such as plush or felt, and thereby the possibility of contaminating the film with lint or other foreign matter originating in the light seal. Since recess 76 is wider than opposing wall 78, the passageway may freely accommodate the adhesive paster 58 which must pass therethrough during the initial film winding operation.

After the film and paper have been completely wound onto the take-up spool, the passageway is obviously no longer completely light tight. At this stage of the winding operation, however, the trailing end of the backing paper has been wound upon the spool over the exposed film and substantially reduces the danger of the film being fogged by any slight amount of light entering through the passageway of the spool chamber. As a means of further protecting the fully exposed film in the spool chamber, cameras adapted to accommodate such magazines may be provided with film metering mechanisms, as described in the above-identified pending Harvey patent application, which limit the final winding operation of the camera to cause the end of the backing strip to remain in the passageway of the spool chamber. While the presence of the paper alone in the passageway does not provide quite as effective a light seal as does paper and film together, this arrangement, in conjunction with the backing paper wound over the exposed film on the spool, substantially eliminates the danger of fogging the film.

*Film guiding means.*—As the fim and paper are wound from the supply chamber into the spool chamber, the lateral freedom of the strips in the area of the film gate is limited by edge guides 82 and 83, molded integrally with the magazine body 52 as most clearly illustrated in FIGS. 1, 4 and 8. These guide members accurately center the film and paper in the film gate and guide it onto the spool while providing just sufficient lateral freedom to allow for slight variations in the width of the strips. As an additional means of preventing the film from riding over the flanges 69 of the spool 54 and causing jamming or damage to the film, the semi-cylindrical internal surface 84 of the spool chamber located between the spool flanges is of smaller radius than the flanges as shown in FIG. 7. At the point where the film strip enters the spool chamber, similar means are employed on the magazine cover, as shown at 85 of FIGS. 5 and 7, to guide the film between the spool flanges.

*Magazine locating means.*—As shown in FIG. 10, a camera adapted to accommodate a magazine according to the present invention may comprise in a preferred embodiment a main housing 86 provided with a central box-like member 87 located between two chambers 88 and 89 adapted respectively to freely accommodate the film supply and spool chamber portions of the magazine. A continuous rearwardly projecting rib 91 is provided along the rearward portion of member 87, and is adapted to be received by a corresponding continuous channel 92 surrounding the exposure opening of the magazine as illustrated in FIGS. 6, 8 and 9. To load the camera, the hinged cover member 93 is released by means of latch member 94 and is moved to the position illustrated. After the film winding knob 95 is withdrawn, as shown, to retract the spool engaging key, not shown, from chamber 89, the magazine is placed in the camera with rib 91 in mating relation with channel 92. The cover member may then be closed and the winding knob depressed to engage the key with a suitable clutch member 96 formed in one of the flanges of the film take-up spool. With the cover in its closed position behind the magazine, pressure pads 97 on the magazine are engaged by spring members 98 on the hinged cover member to urge the magazine forward with the bottom surface 99 of channel 92 in contact with the rear surface 100 of rib 91, thereby accurately locating the film plane of the magazine with respect to the camera lens system 101. To prevent distortional influences on the magazine in the camera, the lateral positioning of the magazine is determined by the lateral freedom of rib 91 in channel 92 so that other portions of the magazine are held out of contact with the camera housing. As is readily apparent, the cooperating rib and slot structure between the camera and magazine also serves to provide a labyrinth light barrier between the two units so that of the camera components, only the box-like member 87 need be light-tight.

*Exposure guide label.*—As illustrated in FIGS. 1 and 10, an exposure guide label 59 appropriate to the particular type of film in a magazine may be attached to the cover thereof in the area surrounding aperture 102 through which exposure indicating numerals 103, FIG. 1, are visible. With the magazine installed in the camera, the exposure guide label and the exposure indicating numeral aligned with the aperture are visible through window 104 in hinged cover member 93. Since the magazine is not intended to be reused, the appropriate label may be permanently attached to the loaded magazine or, if desired, an appropriate guide might be molded into the magazine back prior to assembling the magazine, in which case, of course, the advantage of being able to load all kinds of film into the same magazine components would be lost.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

I claim:

1. A molded plastic film magazine comprising: a body member defining a substantially semi-cylindrical film receptacle with closed ends, a substantially semi-cylindrical spool receptacle with open ends provided with an inwardly directed rib adjacent each end thereof, and an intermediate front wall member connecting said receptacles and provided with an exposure aperture, said front wall member having a rearwardly directed flat surface bounding said exposure aperture and forwardly directed surfaces surrounding said exposure aperture to define a continuous slot thereabout; a cover member comprising means cooperating with said film receptacle to define a closed substantially cylindrical chamber with a passageway tangential thereto adjacent one side of said exposure aperture, means on said cover member cooperating with said spool receptacle to define a substantially cylindrical open-ended spool chamber having a film passageway tangential thereto and adjacent the opposite side of said exposure aperture and an inwardly directed circumferential rib adjacent each open end thereof, means defining a rear wall spaced from said intermediate wall member to provide a film guideway between said chambers behind said exposure aperture, said rear wall having a forwardly projecting flat rectangular surface slightly smaller than said exposure aperture and aligned therewith to establish a flat film plane, and a film spool having flanges provided with circumferential grooves in the peripheries thereof, said spool being rotatably supported and axially located in said spool chamber by the engagement of said circumferential ribs with said grooves.

2. A film magazine for loading into a camera having forwardly extending first and second chambers and rearwardly extending hollow housing means disposed between said chambers and having a continuous rearwardly projecting rib defining an opening in communication with the housing means, said film magazine comprising:
(1) open body member means forming
(a) a substantially semi-cylindrical film receptacale to be received within said first chamber of said camera,
(b) a substantially semi-cylindrical spool receptacle to be received within said second chamber of said camera and having open ends,
(c) and an intermediate front wall member connecting said receptacles and provided with an exposure aperture in alignment with said opening in said camera, said front wall member having a rearwardly facing flat surface bounding said exposure aperture, and a forwardly directed continuous rib surrounding said exposure aperture for positioning cooperation with said continuous rearwardly projecting camera rib by contiguous relation thereto when the magazine is loaded into said camera;
(2) cover member means comprising:
(a) means cooperating with said film receptacle to define a closed substantially cylindrical chamber with a passageway communicating therewith adjacent one side of said exposure aperture,
(b) means cooperating with said spool receptacle to define a substantially cylindrical open-ended spool chamber having a passageway communicating therewith adjacent the opposite side of said exposure aperture,
(c) and means defining a rear wall spaced from said intermediate front wall member to provide a film guideway between said chambers behind said exposure aperture, said rear wall having a forwardly projecting portion establishing a substantially flat area overlying said exposure aperture to provide a film plane;
(3) and a film spool having flange means, at least one of said open ends of the spool chamber having guideway means cooperating with said spool flange means to rotatably guide and axially locate said spool.

3. A factory-loaded molded plastic film magazine comprising:
first wall means defining a closed substantially cylindrical film chamber and a passageway to the chamber;
a roll of film with light-protective backing paper connected thereto and wound therewith in said film chamber;
second wall means defining a substantially cylindrical open-ended spool chamber and a passageway to the chamber and having radially inwardly directed rib means on each end of said spool chamber;
an intermediate front wall member connecting said first and second wall means and provided with an exposure aperture, said front wall member having a rearwardly facing surface surrounding said exposure aperture to define a continuous slot thereabout;
an intermediate rear wall connecting said first and second wall maens and spaced from and cooperating with said intermediate front wall member to provide a film guideway behind said exposure aperture and in communication with said passageway to said film and spool chambers;
said intermediate rear wall having a forwardly projecting portion establishing a substantially flat area behind said exposure aperture to provide a film plane in cooperation with said intermediate front wall member;
said light-protective backing paper extending through said film guideway from said film chamber over said rearwardly facing flat surface and said exposure aperture of said intermediate front wall member and into said spool chamber;
and a rotatable film spool for pulling said light-protective backing paper and film from said film chamber and along said film guideway across said exposure aperture when said spool is rotated to wind the backing paper and film thereon, said spool having flanges, the periphery of each of which is provided with a circumferential groove engaging said rib means, and to which spool one end of said light-protective backing paper is attached, said spool being rotatably supported and axially located in said spool chamber by the engagement of said rib means with said circumferential grooves;
said light-protective backing paper forming with said rearwardly facing flat surface of said intermediate front wall member, on the one hand, and with said forwardly projecting portion of said intermediate rear wall, on the other hand, light sealing means substantially restricting the entry of light through the exposure aperture into said guideway in the direction of said chambers.

4. A factory-loaded molded plastic film magazine comprising:
(1) a roll of film and light-protective backing paper connected thereto;
(2) open body member means forming
(a) a substantially semi-cylindrical film receptacle for receiving said roll of film and light-protective backing paper,
(b) a substantially semi-cylindrical spool receptacle with open ends provided with at least one inwardly directed rib adjacent each end thereof,
(c) and an intermediate front wall member connecting said receptacles and provided with an exposure aperture, said front wall member having a rearwardly facing flat surface bounding said exposure aperture and forwardly facing surfaces surrounding said exposure aperture to define a continuous slot thereabout;
(3) said light-protective backing paper extending from said film receptacle over said rearwardly facing flat surface and said exposure aperture of said intermediate front wall member and into said spool receptacle;
(4) cover member means comprising:
(a) means cooperating with said film receptacle to define a closed substantially cylindrical chamber for containing said roll of film and backing paper and provided with a passageway communicating therewith adjacent one side of said exposure aperture, (b) means cooperating with said spool receptacle to define a substantially cylindrical open-ended spool chamber having a film passageway communicating therewith adjacent the opposite side of said exposure aperture, and an inwardly directed rib adjacent each open end thereof, (c) means defining a rear wall spaced from said intermediate front wall member to provide a film guideway between said chambers and behind said exposure aperture, said rear wall having a forwardly projecting portion establishing a substantially flat area overlying said exposure aperture to provide a film plane;

(5) said rearwardly facing flat surface adapted to engage and maintain the film and backing paper when co-extensively disposed across said exposure aperture in flat supported engagement with said forwardly projecting portion;

(6) and a film spool having flanges provided with circumferential grooves in the peripheries thereof, said spool being rotatably supported and axially located in said spool chamber by the engagement of said circumferential ribs with said grooves for pulling said light-protective backing paper and film from said film chamber and across said film guideway when said spool is rotated to wind the backing paper and film thereon;

(7) said light-protective backing paper forming with said rearwardly facing flat surface, on the one hand, and with said forwardly projecting portion, on the other hand, a light sealing means substantially restricting the entry of light from the exposure aperture between the last-mentioned surface and portion.

References Cited in the file of this patent

UNITED STATES PATENTS

| | | |
|---|---|---|
| 1,666,077 | Victor | Apr. 17, 1928 |
| 2,051,206 | Fairbanks | Aug. 18, 1936 |
| 2,169,548 | Zapp | Aug. 15, 1939 |
| 2,218,966 | Zapp | Oct. 22, 1940 |
| 2,381,033 | Bolsey | Aug. 7, 1945 |
| 2,476,996 | Nebel | July 26, 1949 |
| 2,680,574 | Grove | June 8, 1954 |
| 2,924,158 | Kopp et al. | Feb. 9, 1960 |

FOREIGN PATENTS

| | | |
|---|---|---|
| 14,490 | Great Britain | 1908 |